(12) United States Patent
Claxton

(10) Patent No.: US 10,072,397 B2
(45) Date of Patent: Sep. 11, 2018

(54) PAYLOAD MANAGEMENT SYSTEM

(71) Applicant: Flanders Electric Motor Service, Inc., Evansville, IN (US)

(72) Inventor: Richard L. Claxton, Evansville, IN (US)

(73) Assignee: Flanders Electric Motor Service, Inc., Evansvile, IN (US)

( * ) Notice: Subject to any disclaimer, the term of this patent is extended or adjusted under 35 U.S.C. 154(b) by 0 days.

(21) Appl. No.: 15/420,661

(22) Filed: Jan. 31, 2017

(65) Prior Publication Data
US 2017/0204590 A1  Jul. 20, 2017

Related U.S. Application Data

(62) Division of application No. 13/828,380, filed on Mar. 14, 2013, now abandoned.

(60) Provisional application No. 61/671,880, filed on Jul. 16, 2012.

(51) Int. Cl.
| | |
|---|---|
| *E02F 9/00* | (2006.01) |
| *G01G 19/12* | (2006.01) |
| *E02F 9/24* | (2006.01) |
| *E02F 3/30* | (2006.01) |
| *E02F 9/22* | (2006.01) |
| *E02F 3/40* | (2006.01) |
| *G01B 21/22* | (2006.01) |

(52) U.S. Cl.
CPC .............. *E02F 9/24* (2013.01); *E02F 3/308* (2013.01); *E02F 3/401* (2013.01); *E02F 9/006* (2013.01); *E02F 9/2271* (2013.01); *G01B 21/22* (2013.01); *G01G 19/12* (2013.01)

(58) Field of Classification Search
None
See application file for complete search history.

(56) References Cited

U.S. PATENT DOCUMENTS

| | | | | |
|---|---|---|---|---|
| 4,627,013 A | * | 12/1986 | Ichiyama | ................ E02F 9/264 177/141 |
| 2010/0100338 A1 | * | 4/2010 | Vik | ..................... G01M 5/0033 702/42 |

* cited by examiner

*Primary Examiner* — Todd Melton
*Assistant Examiner* — Jason R Roberson
(74) *Attorney, Agent, or Firm* — Chetlin IP, P.C.

(57) ABSTRACT

A payload management system embodiment may include a force sensing system operatively associated with a bucket of an excavator. The force sensing system senses a magnitude of a force required to hold the bucket at a defined position with respect to a reference datum. An angle sensing system operatively associated with the bucket senses a direction of the force with respect the reference datum. A processing system operatively associated with the force system and the angle sensing system processes data relating to the magnitude of the force and the direction of the force to determine the amount of the payload in the bucket.

12 Claims, 6 Drawing Sheets

PAYLOAD MANAGEMENT SYSTEM

CROSS-REFERENCE TO RELATED APPLICATIONS

This application claims the benefit of U.S. Provisional Patent Application No. 61/671,880, filed on Jul. 16, 2012, and U.S. patent application Ser. No. 13/828,380, filed on Mar. 14, 2013, both of which are hereby incorporated herein by reference for all that they disclose.

TECHNICAL FIELD

The present invention relates to excavation machines in general and more particularly to systems and methods for determining information and data relating to the operational performance of excavators.

BACKGROUND

Excavation machines or excavators are well-known in the art and have been used for decades in a wide variety of applications to dig up or extract material, typically earthen material, from a work site. While excavators come in a wide range of sizes and configurations, most involve a cab or house that is mounted to an undercarriage having a plurality of tracks or wheels provided thereon. A bucket or dipper is mounted to the cab via an articulated arm assembly that typically comprises a boom member and a stick member. The boom member is mounted to the cab and the stick member is mounted to the end of the boom. Actuators, such as hydraulic actuators, operatively associated with the cab, boom, stick, and bucket allow the various elements to be moved with respect to one another to pull the bucket through the material to be excavated and thereafter deposit the excavated material contained in the bucket at a suitable location (e.g., into the bed of a haul truck).

SUMMARY OF THE INVENTION

A payload management system according to one embodiment may include a force sensing system operatively associated with a bucket of an excavator, the force sensing system sensing a magnitude of a force required to hold the bucket at a defined position with respect to a reference datum. An angle sensing system operatively associated with the bucket senses a direction of the force with respect the reference datum. A processing system operatively associated with the force sensing system and the angle sensing system processes data relating to the magnitude of the force and the direction of the force to determine the amount of the payload in the bucket.

Also disclosed is a method for determining an amount of a payload contained in a bucket of an excavator that involves the steps of: Sensing a magnitude of a force required to hold the bucket at a defined position with respect to a reference datum; sensing a direction of the force with respect the reference datum; and determining the amount of the payload in the bucket based on the magnitude and direction of the force.

BRIEF DESCRIPTION OF THE DRAWINGS

Illustrative and presently preferred exemplary embodiments of the invention are shown in the drawings in which.

DETAILED DESCRIPTION OF THE PREFERRED EMBODIMENTS

Payload management system 10 and method according to embodiments of the present invention are shown and described herein as they could be used with respect to excavator 12. As will be described in much greater detail herein, payload management system 10 may be used to collect and/or determine information and data relating to various aspects of the operation of the excavator 12. For example, in one embodiment payload management system 10 determines an amount (e.g., weight) of payload contained within a shovel bucket 14 of excavator 12. In another embodiment, payload management system 10 may provide information or data relating to a number of digging cycles performed by the excavator 12 over a period of time. In still another embodiment, the payload management system 10 may provide information and data relating to the maximum payloads and/or forces imposed on the excavator 12 during a given operational period.

Figure 1:
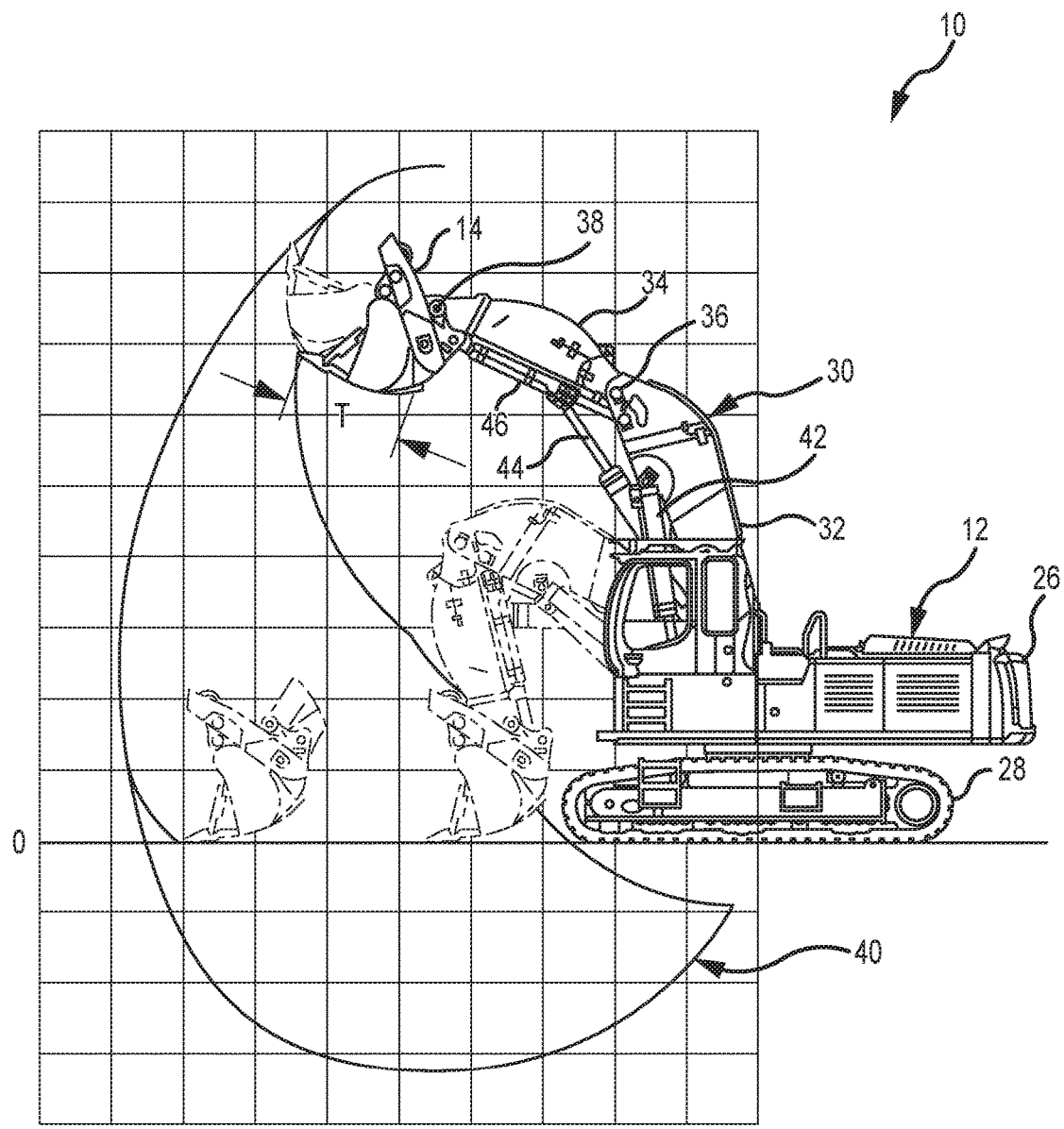
FIG. 1 is a pictorial representation of an excavator embodying the systems and methods of the payload management system according to present invention.
Figure 2:
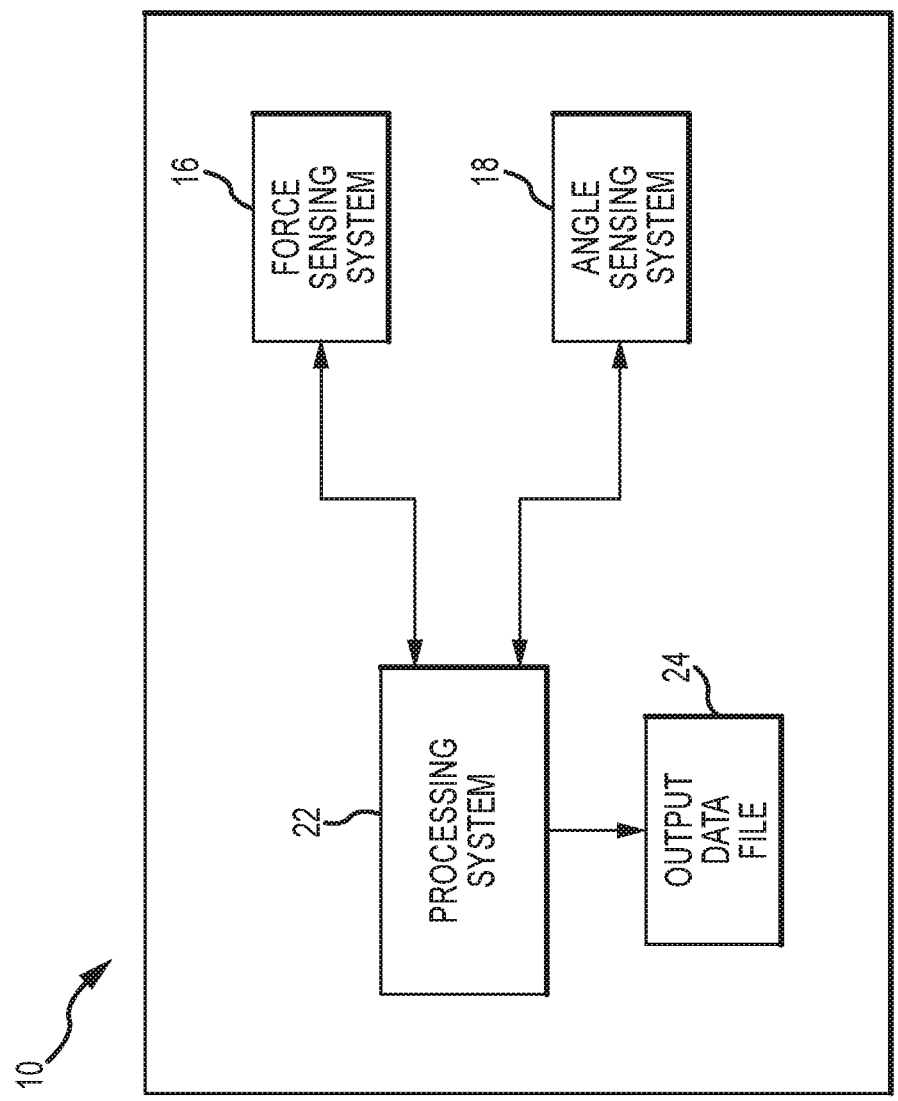
FIG. 2 is a schematic representation of the payload management system according to one embodiment of the present invention.
Figure 3:
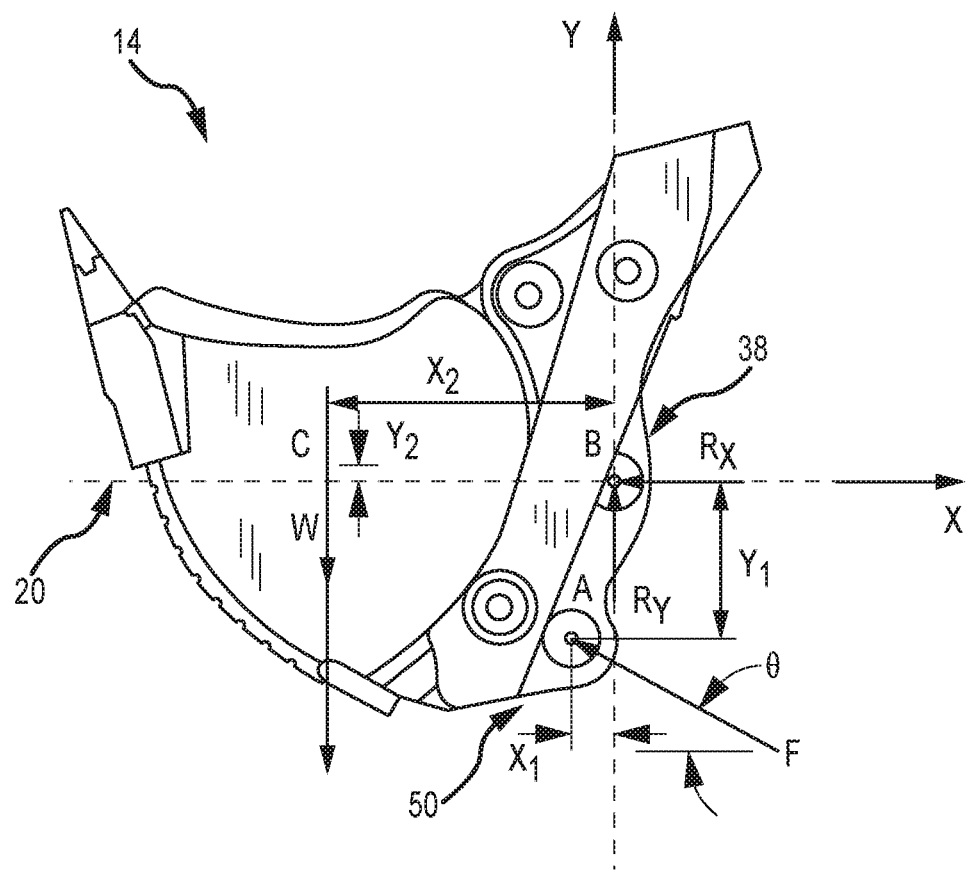
FIG. 3 is a free-body diagram of the bucket assembly of the excavator illustrated in FIG. 1.

Briefly, and referring now to FIGS. 1-3, one embodiment of payload management system 10 may comprise a force sensing system 16 and an angle sensing system 18. The force and angle sensing systems 16 and 18 are operatively associated with various components of the excavator 12 in a manner that will be described in further detail herein. The force sensing system 16 senses a magnitude of a force F that is required to hold the shovel bucket 14 of the excavator 12 at a defined position with respect to a reference datum 20, as best seen in FIG. 3. The angle sensing system 18 senses the direction (e.g., angle θ) of the force F with respect to the reference datum 20.

Payload management system 10 may also comprise a processing system 22 that is operatively associated with or connected to the force sensing system 16 and the angle sensing system 18. The processing system 22 receives information or data relating to the force F and angle θ sensed by the force and angle sensing systems 16 and 18, respectively. Processing system 22 uses that information to determine or calculate information and/or data relating to various aspects of the operational performance of the excavator 12.

For example, in the particular embodiments shown and described herein, the processing system 22 is configured to determine or calculate the amount of payload contained in the shovel bucket 14. Processing system 22 may also determine the number of digging cycles performed by the excavator 12 over a period of time. In still other embodiments, processing system 22 may use the information relating to the forces and angles to determine or calculate still other information relating to the operation of the excavator 12. Processing system 22 may thereafter create an output data file 24 comprising data relating to the calculated payload, number of digging cycles, and any other desired information relating to the operation of the excavator 12.

A significant advantage of payload management system 10 and method of the present invention is that they can readily be used to determine a wide variety of information relating to operational performance of excavation machines (e.g., excavator 12), including the amount or weight of payload in the bucket. Moreover, because the present invention involves the sensing of various parameters via sensor devices in close operational proximity to shovel bucket 14, the present invention provides a comparatively simple, relatively inexpensive means for determining operational parameters relating to shovel bucket 14, so that, for example, payload can be maximized efficiently while minimizing pivot point fatigue.

Having briefly described the payload management system 10 according to one embodiment of the present invention, as well as some of its more significant features and advantages, various embodiments and alternative configurations of payload management system 10 will now be described in detail.

Figure 5:
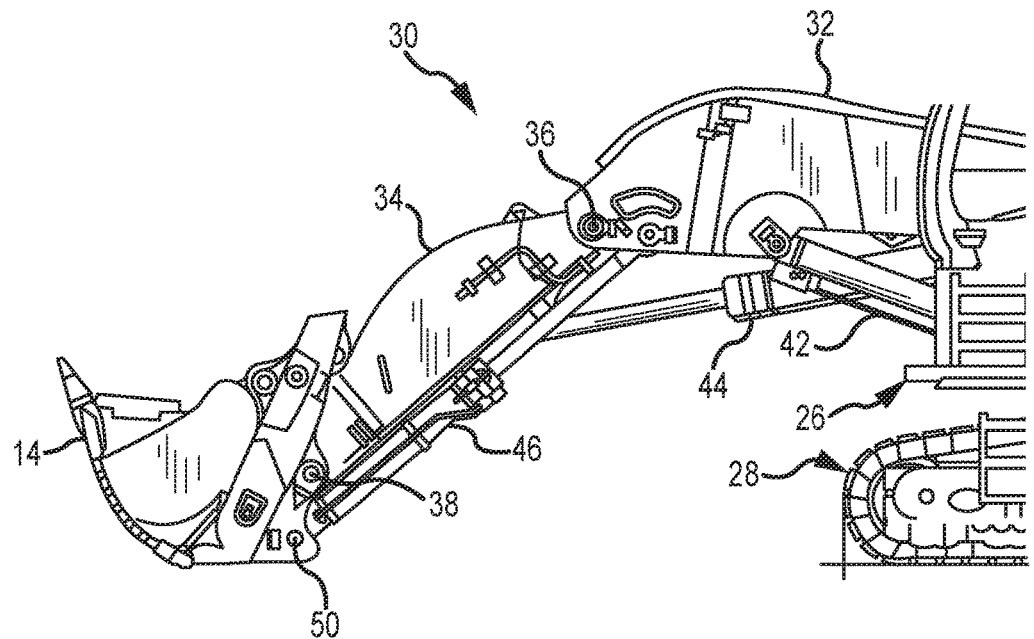
FIG. 5 is an enlarged side view of the boom, stick and bucket assemblies of the excavator illustrated in FIG. 1 showing the location of a force sensing clevis pin that may be used in another embodiment of the invention.

Referring back now to FIGS. 1-3 simultaneously, the systems and methods comprising payload management system 10 may be provided on excavator 12 of the type well-known in the art. In the particular exemplary embodiment shown and described herein, excavator 12 may comprise a house or cab assembly 26 that is pivotally mounted to a tracked undercarriage assembly 28. The shovel bucket 14 of excavator 12 is mounted to cab assembly 26 via an articulated arm assembly 30. In the particular embodiment shown and described herein, the articulated arm assembly 30 comprises a boom member 32 and a stick member 34. The boom member 32 is pivotally mounted to cab assembly 26, whereas the stick member 34 is pivotally mounted to the boom member 32 at joint 36, as best seen in FIGS. 1 and 5. The shovel bucket 14 is pivotally mounted to the stick member 34 at joint 38. The articulated arm assembly 30 allows shovel bucket 14 to be moved within a motion envelope 40, as best seen in FIG. 1, where "T" shows the tilt range of shovel bucket 14, "0" denotes a ground plane and alternate positions for shovel bucket 14 within motion envelope 40 are also shown.

In the particular embodiment shown and described herein, the excavator 12 is hydraulically powered, although other arrangements are known in the art and may be used on other types of excavators. In the embodiment illustrated in FIG. 1, an internal combustion engine (e.g., a diesel engine, not shown) provided in the cab assembly 26 of excavator 12 is used to drive one or more hydraulic pumps (also not shown) that are fluidically connected to a variety of hydraulic actuators, thereby allowing for the operation of excavator 12. More specifically, boom member 32 is moved or operated by one or more boom actuators or rams 42 connected between the boom member 32 and cab assembly 26. Similarly, the stick member 34 is moved or operated by a stick actuator or ram 44 connected between the boom member 32 and stick member 34. Shovel bucket 14 is likewise moved or operated by a bucket actuator or ram 46. In the particular excavator 12 shown in FIG. 1, the bucket actuator 46 is connected between shovel bucket 14 and boom member 32, although other arrangements are possible.

With reference now primarily to FIG. 3, the amount (e.g., weight) of payload contained in shovel bucket 14 may be determined or calculated from the force vector F that is required to hold the shovel bucket 14 at a defined position with respect to the reference datum 20. Stated differently, both the magnitude of the force F, as well as the direction or angle θ the force F makes with respect to the reference datum 20, are required to determine the payload contained within the shovel bucket 14. In the arrangement illustrated in FIG. 3, the reference datum 20 is substantially horizontal, i.e., parallel to the X-axis. In such an orientation, the weight of the payload is given by the following equation (neglecting any angular acceleration of the shovel bucket):

$$\text{Payload} = \frac{(F \cdot (\sin\theta \cdot x_1 + \cos\theta \cdot y_1) + W_{bucket} \cdot x_2}{x_2} \quad (1)$$

where:
F=the magnitude of the applied force;
θ=the angle the applied force makes with respect to the reference datum (e.g., the horizontal);
$x_1$=the horizontal distance between the hydraulic actuator pin "A" and the structural pin "B"; and
$x_2$=the horizontal distance between the structural pin "B" and the centroid "C" of the shovel bucket/payload system.

The horizontal and vertical reaction forces at the structural shovel bucket pivot pin B (at joint 38) are designated Rx and Ry, respectively. Those reaction forces may be determined as follows, again neglecting any affects due to acceleration:

$$R_x = F \cos \theta \quad (2)$$

$$R_y = \text{Payload} + W_{bucket} - F \sin \theta \quad (3)$$

Figure 4:
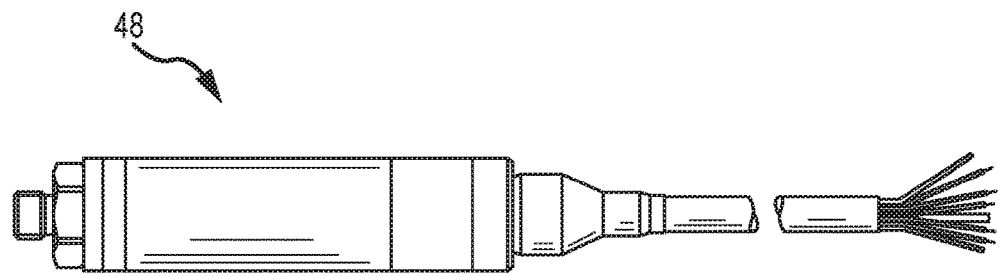
FIG. 4 is a side view in elevation of a pressure transducer for sensing hydraulic pressure that may be used in one embodiment of the present invention.

The magnitude of the force F applied to the shovel bucket 14 (i.e., to the hydraulic actuator pin "A" in FIG. 3) is measured or sensed by the force sensing system 16 (FIG. 2). In one embodiment, the force sensing system 16 comprises one or more hydraulic pressure sensors or transducers 48 (FIG. 4) that are operatively connected to the bucket ram 46. The pressure transducer(s) 48 senses the hydraulic pressure that is applied to the bucket ram 46. In most applications, it will be desirable to use two pressure transducers 48, one on each side of the piston (not shown) comprising the bucket ram 46. The pressure transducers 48 may be mounted directly to the inlet/outlet ports of the bucket ram 46. Alternatively, the pressure transducers 48 may be mounted at some other location in the in the hydraulic lines connected to the bucket ram 46.

The hydraulic pressure transducer(s) 48 may comprise any of a wide range of pressure transducers now known in the art or that may be developed in the future that are or would be suitable for the particular application. Consequently, the present invention should not be regarded as limited to any particular type of pressure transducer. However, by way of example, in one embodiment, the pressure transducer(s) 48 may comprise a model DPS 4060 pressure sensor available from the GE Sensor division of the General Electric Company (US).

Figure 6:
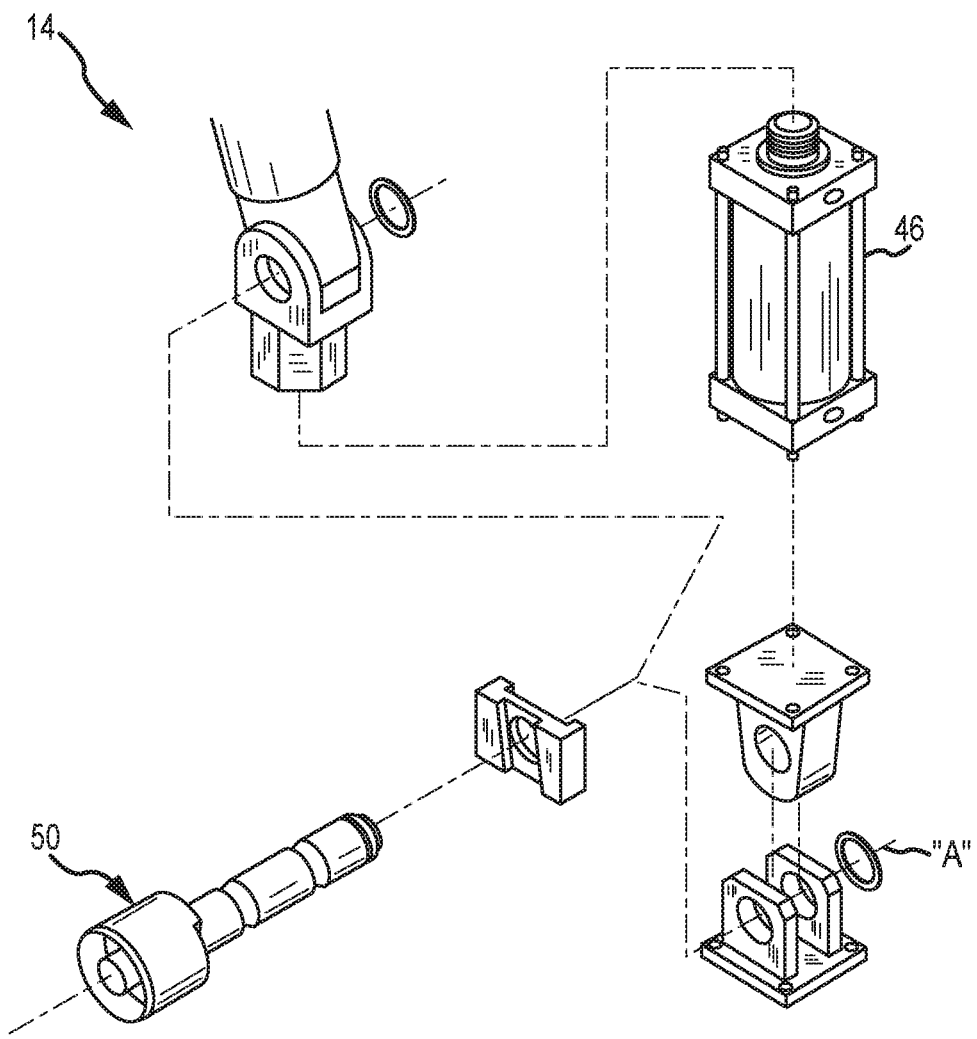
FIG. 6 is an exploded view in perspective of various components of a force sensing clevis pin assembly according to one embodiment of the present invention.
Figure 7:
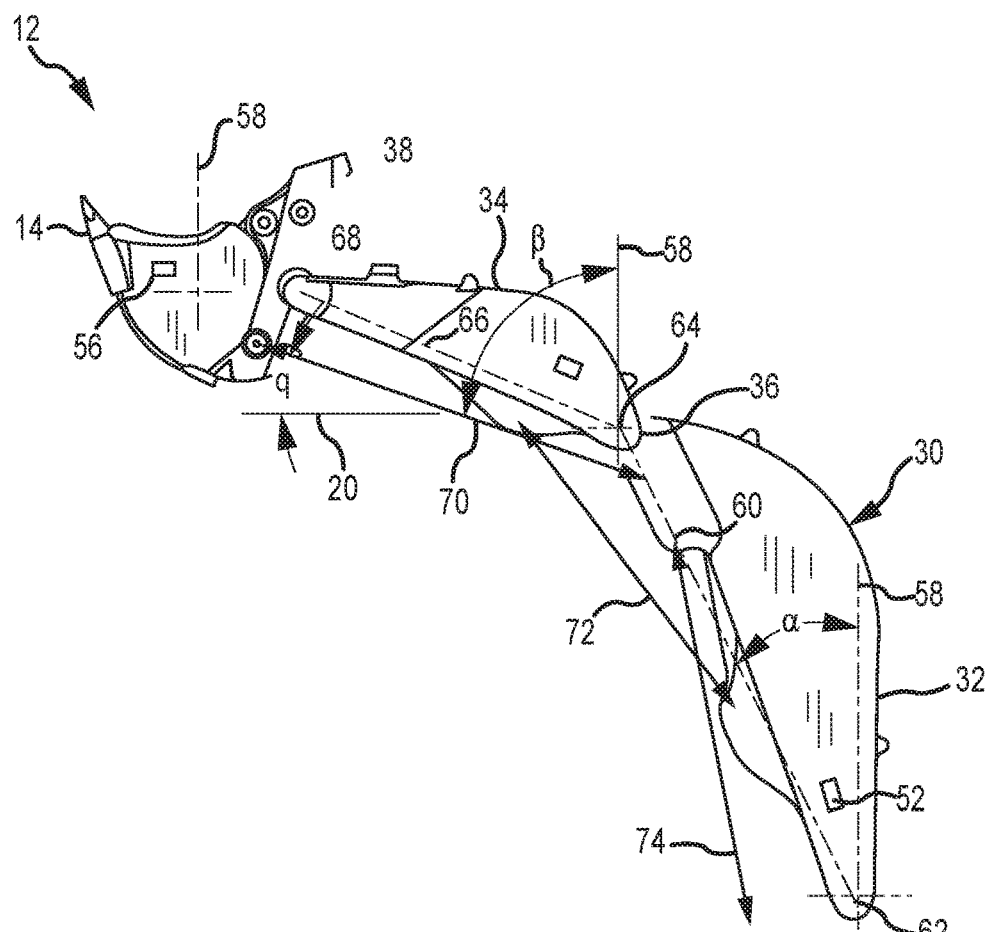
FIG. 7 is a side view in elevation of the boom, stick, and bucket assemblies of the excavator showing relative angles thereof that may be sensed to determine an angle θ that a line of action of the force F makes with respect to the reference datum.
Figure 8:
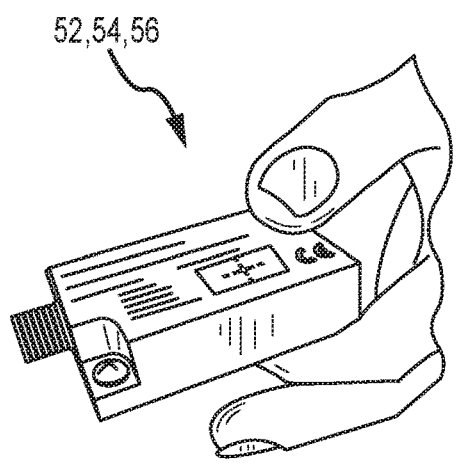
FIG. 8 is a pictorial representation of an inclinometer that may be used in one embodiment of the invention.

In an alternative embodiment, the force sensing system 16 may sense or determine the magnitude of the force F applied to the shovel bucket 14 (i.e., to the hydraulic actuator pin "A") by measuring the strain in the hydraulic actuator pin. In such an embodiment, a plain pin at first pivot point "A" (FIG. 3) is replaced by a force sensing clevis pin 50, as best seen in FIGS. 5 and 6. Force sensing clevis pin 50 may be provided with one or more strain-sensing elements or strain gauges (not shown) that sense the strain in clevis pin 50. Because the strain in force sensing clevis pin 50 is related to the force applied to the pin 50 (e.g., by bucket ram 46), the measurement of the strain in force sensing clevis pin 50 will allow the force sensing system 16 to determine the magnitude of the force F applied to force sensing clevis pin 50 (as indicated by arrow 70 on FIG. 7). In one embodiment, force sensing clevis pin 50 may comprise a "uniaxial" force sensing pin in which the force on the pin is determined based on detected strain along a single axis. If such a uniaxial pin is used, then it will be desirable to ensure that the pin does not rotate with respect to the bucket actuator or ram 46.

Force sensing clevis pin 50 may comprise any of a wide range of pins that are well known in the art or that may be developed in the future that are or would be suitable for the particular application. Consequently, the present invention should not be regarded as limited to any particular type of force sensing clevis pin. However, by way of example, in one embodiment, the force sensing clevis pin 50 may be of the type shown and described in U.S. Pat. No. 3,695,096, issued Oct. 3, 1972, and entitled "Strain Detecting Load Cell," which is specifically incorporated herein by reference for all that it discloses.

In still yet another embodiment, a force sensing pivot pin (not shown) could also be provided at second pivot point "B" (e.g., joint 38) (FIG. 3). The force sensing pivot pin may comprise a "biaxial" force sensing pin which is capable of measuring strain in the pin along two, preferably orthogonal axes (e.g., along the "X" and "Y" directions illustrated in FIG. 3). Use of the force sensing pivot pin will allow the reaction forces at point "B", joint 38, (e.g., $R_x$ and $R_y$) to be more directly determined (e.g., by the strain sensing elements provided in the force sensing pivot pin). If used, the force sensing pivot pin may comprise a pin of the type described above for force sensing clevis pin 50, but with strain sensing elements arranged to measure strain in two axes. The force sensing pivot pin would also be connected to the processing system 22 to allow data produced by the force sensing pivot pin to be processed in order to determine various types of information and data (e.g., the reaction forces $R_x$ and $R_y$ at second pivot point "B" at joint 38 in the location of the shovel bucket pivot pin) about the loads on excavator 12.

As briefly described above, the angle θ that the force F makes with respect to the reference datum 20 is sensed by the angle sensing system 18. In one embodiment, angle sensing system 18 senses or determines the angle θ by means of an inclinometer 56 mounted to or operatively associated with the shovel bucket 14. See FIG. 7. The inclination of the shovel bucket 14 sensed by inclinometer 56 may be used to determine the angle θ. Optionally, and in the particular embodiment shown and described herein, the system 10 may also comprise supplemental inclinometers 52 and 54 that are mounted to articulated arm assembly 30, as also best seen in FIG. 7. More specifically, inclinometer 52 may be mounted to the boom member 32 so as to sense an angle α between the vertical 58 and line 60 connecting pivot axes 62 and 64 on boom member 32, with arrow 74 indicating the force vector F applied on boom member 32 by ram 42 (e.g., boom actuator). Similarly, inclinometer 54 may be mounted to stick member 34 so as to sense an angle β between the vertical 58 and line 66 connecting pivot axes 64 and 68, with arrow 72 indicating the force vector F applied on stick member 34 by ram 44. Processing system 22 may use the angle information from inclinometers 52 and 54 to make other determinations about the excavator 12 including, for example, whether the shovel bucket 14 is in tuck, in the bank (i.e., digging), or has been raised or elevated to a level sufficient to clear the bank. See, e.g., FIG. 1. In one embodiment in which the biaxial force sensing pin is employed, supplemental inclinometers 52 and 54 are not necessary.

Inclinometer 56, as well as supplemental inclinometers 52 and 54, may comprise any of a wide range of inclinometers that are now known in the art or that may be developed in the future that are or would be suitable for the intended application. Consequently, the present invention should not be regarded as limited to any particular type of inclinometer. However, by way of example, in one embodiment, each inclinometer may comprise a dual axis inclinometer manufactured by Turck, Inc., and available from a wide range of vendors.

As described above, and with reference back now primarily to FIG. 2, payload management system 10 also comprises a processing system 22 that is operatively connected to the force sensing system 16 and the angle sensing system 18. Processing system 22 receives data from the force and angle sensing systems 16 and 18 and uses and/or processes that data to create an output data file 24 comprising information and data relating to various operational aspects of the excavator 12. For example, in one embodiment, the processing system 22 uses the force and angle data to determine or calculate the amount (e.g., the weight) of payload contained in the shovel bucket 14. Such payload data may be used, for example, to assess the operational performance and/or productivity of the excavator 12. In another embodiment, the processing system 22 may determine or calculate information relating to the number of digging cycles performed by the excavator 12 over a period of time. In still another embodiment, the processing system 22 may provide information and data relating to the maximum payload and/or forces imposed on the excavator 12. Advantageously, this information and data may be used to maximize production efficiency while minimizing pivot pin fatigue and unplanned downtime that may result where such fatigue cannot be effectively managed.

In accordance with this functionality, processing system 22 may comprise a general purpose programmable computer that is configured or programmed to automatically process the data collected by the force and angle sensing systems 16 and 18 to produce the desired information and data. In an embodiment wherein payload management system 10 is to produce information relating to the payload weight in the shovel bucket 14, the processing system 22 may be programmed to automatically process the collected force data (e.g., magnitude and direction of force F) in accordance with Equation (1) to yield a payload weight. Similarly, processing system 22 may be programmed or configured to automatically calculate the reaction forces, $R_x$ and $R_y$, on the shovel bucket pivot pin 38 (second pivot point "B" in FIG. 3). However, because general purpose programmable computers as well as methods for programming them are well-known in the art and could be readily accomplished by persons having ordinary skill in the art after having become familiar with the teachings provided herein, the particular processing system 22 and programs embodied therein will not be described in further detail.

Accordingly, in conjunction with the payload management system 10, the method of the present invention for determining the amount of the payload contained in bucket 14 of excavator 12 comprises sensing the magnitude of the force F required to hold shovel bucket 14 at a defined position with respect to the reference datum 20 (e.g., the horizontal), as shown in FIG. 3. As discussed in more detail above, in one embodiment, the magnitude of force F may be sensed by force sensing system 16, comprising pressure transducer(s) 48 that sense the hydraulic pressure applied to bucket ram 46. In an alternative embodiment, the step of sensing the magnitude of force F may be accomplished by force sensing clevis pin 50 as part of force sensing system 16. In this embodiment, sensing the magnitude of the force F comprises sensing the strain in force sensing clevis pin 50 uniaxially at the first pivot point ("A" in FIG. 3). In another embodiment, strain is sensed biaxially at the second pivot point ("B" in FIG. 3), as well, in the manner as has previously been described.

The method of the present invention also comprises sensing the direction of the force (e.g., angle θ) with respect the reference datum 20 via angle sensing system 18. Sensing the direction of the force comprises determining angle θ by means of inclinometer 56 of angle sensing system 18 that is operatively associated with shovel bucket 14.

The method further comprises determining the amount of the payload (e.g., weight) in shovel bucket 14 based on the magnitude and direction of the force. In embodiments of the method, determining the payload in shovel bucket 14 comprises using Equation 1 with force and angle data collected from force sensing system 16 and angle sensing system 18 of payload management system 10. As is explained in more detail below, the payload may then be used to control operation of excavator 12 and otherwise decide when excavator 12 should be dispatched to another location or be taken out of service, for example. In embodiments of the present invention, this determining step may be performed automatically by processing system 22.

Payload management system 10 may be operated in accordance with the method of the present invention as follows in order to provide any of a wide range of desired information relating to the operational performance of the excavator 12. Assuming the system 10 has been provided or retro-fitted to excavator 12 in the manner described herein, an operator (not shown) of the excavator 12 would simply operate the excavator 12 in accordance with normal operational procedures specified for the particular use and environment. During a digging sequence, the processing system 22 may monitor the force and angle sensing systems 16 and 18 to collect force and angle data. Such data could be used, for example, in determining the number of digging cycles performed by excavator 12 as well as to provide some indication of the forces imposed on excavator 12 during operation.

The amount of payload contained in the shovel bucket 14 may be determined at the conclusion of a given digging cycle. More specifically, the system 10 would sense (e.g., via the force sensing system 16) the magnitude of the force F required to hold the shovel bucket 14 in the particular position. The system 10 would also sense (e.g., via the angle sensing system 18) the angle θ at which the force F is applied to shovel bucket 14. The processing system 22 would then determine the amount (e.g., weight) of payload contained in the shovel bucket 14 via equation (1). Processing system 22 would then provide or write the payload data to the output data file 24. Data from the output file 24 may be used for a variety of purposes. For example, in one embodiment, the data from output data file 24 may be sent or transmitted to a "dispatch" system which monitors and/or directs the movement of machines. Alternatively, other uses for the data are possible and the present invention should not be regarded as limited to any particular subsequent use of the data.

Having herein set forth preferred embodiments of the present invention, it is anticipated that suitable modifications can be made thereto which will nonetheless remain within the scope of the invention. The invention shall therefore only be construed in accordance with the following claims:

What is claimed is:

1. A method for determining an amount of a payload in a bucket of an excavator, the bucket having a first pivot point and a second pivot point, comprising:
 establishing a reference datum, the reference datum being horizontal and extending through the second pivot point;
 applying a force to the first pivot point on the bucket, said force holding the bucket at a defined position with respect to the reference datum;
 measuring an angle at which the force is applied to hold the bucket in the defined position with respect to the reference datum;
 measuring a first strain along a first axis in a pivot pin provided at the second pivot point of the bucket;
 determining a first reaction force along the first axis from the measured first strain and the angle;
 measuring a second strain along a second axis in the pivot pin provided at the second pivot point of the bucket, the second axis being generally orthogonal to the first axis;
 determining a second reaction force along the second axis from the measured second strain and the angle;
 determining the amount of the payload in the bucket based the first and second reaction forces; and
 using the amount of payload to control excavator operations.

2. The method of claim 1, wherein the determining the amount of the payload in the bucket comprises neglecting effects from bucket acceleration.

3. The method of claim 1, wherein determining a first reaction force comprises determining the first reaction force according to the equation: $R_x = F \cos \theta$, where $R_x$ is the first reaction force, F is a magnitude of applied force, and θ is the angle.

4. The method of claim 1, wherein the pivot pin is a biaxial force sensing clevis pin.

5. The method of claim 1, wherein the first pivot point comprises a direct linkage between the bucket and a hydraulic actuator.

6. The method of claim 1, wherein the second pivot point comprises a connection between the bucket and a stick member of the excavator.

7. The method of claim 1, wherein using the amount of payload to control excavator operations comprises minimizing pivot pin fatigue.

8. A payload management system for determining an amount of a payload contained in a bucket of an excavator, the bucket having a first pivot point and a second pivot point, comprising:
 an actuator directly connected to the first pivot point of the bucket, the actuator applying a force to the first pivot point, said force holding the bucket at a defined position with respect to a reference datum, the reference datum being horizontal and extending through the second pivot point;

a biaxial force sensing system operatively associated with the bucket of the excavator, the biaxial force sensing system measuring biaxial strain along a first axis and a second axis provided at the second pivot point of the bucket, the first axis being generally orthogonal to the second axis, a first strain being measured along the first axis and a second strain being measured along the second axis;

an angle sensing system operatively associated with the bucket of the excavator, the angle sensing system sensing a direction of said force with respect to the reference datum; and a processing system operatively associated with said biaxial force sensing system and said angle sensing system, the processing system automatically using the direction and the first strain and the second strain to determine reaction forces on the second pivot point.

9. The method of claim 8, wherein the processing system automatically calculates a payload amount in the bucket from the reaction forces.

10. The method of claim 8, wherein the biaxial force sensing system comprises a force sensing clevis pin.

11. The method of claim 8, wherein the biaxial force sensing system comprises a force sensing pivot pin at the second pivot point.

12. The method of claim 3, wherein determining a second reaction force comprises determining the second reaction force according to the equation:

$$R_y = \text{Payload} + W_{bucket} - F \sin \theta.$$

* * * * *